United States Patent
Armijo et al.

(10) Patent No.: US 10,052,813 B2
(45) Date of Patent: Aug. 21, 2018

(54) METHOD FOR ADDITIVE MANUFACTURING USING FILAMENT SHAPING

(71) Applicant: Arevo, Inc., Santa Clara, CA (US)

(72) Inventors: Armando Armijo, San Diego, CA (US); Hemant Bheda, Saratoga, CA (US); Chandrashekar Mantha, Santa Clara, CA (US); Wiener Mondesir, Oakland, CA (US); Sohil Nandu, Sunnyvale, CA (US); Riley Reese, Sunnyvale, CA (US)

(73) Assignee: AREVO, INC., Santa Clara, CA (US)

( * ) Notice: Subject to any disclaimer, the term of this patent is extended or adjusted under 35 U.S.C. 154(b) by 0 days.

(21) Appl. No.: 15/471,786

(22) Filed: Mar. 28, 2017

(65) Prior Publication Data

US 2017/0274585 A1    Sep. 28, 2017

Related U.S. Application Data

(60) Provisional application No. 62/314,000, filed on Mar. 28, 2016.

(51) Int. Cl.
*B29C 64/141* (2017.01)
*B33Y 10/00* (2015.01)
*B33Y 30/00* (2015.01)
*B33Y 50/02* (2015.01)
*B29C 64/188* (2017.01)
(Continued)

(52) U.S. Cl.
CPC .......... *B29C 64/141* (2017.08); *B29C 64/188* (2017.08); *B33Y 10/00* (2014.12); *B33Y 30/00* (2014.12); *B33Y 50/02* (2014.12); *B29C 64/218* (2017.08); *B29C 64/268* (2017.08); *B29K 2101/12* (2013.01); *B29K 2105/08* (2013.01)

(58) Field of Classification Search
CPC .... B23K 26/342; B23K 9/04; B29C 67/0051; B29C 67/0055; B29C 67/0085
See application file for complete search history.

(56) References Cited

U.S. PATENT DOCUMENTS

| 5,121,329 | A | | 6/1992 | Crump | |
| 5,578,227 | A | * | 11/1996 | Rabinovich | B23K 26/34 156/180 |

(Continued)

FOREIGN PATENT DOCUMENTS

| EP | 3045992 A1 | 7/2016 |
| EP | 3051445 A1 | 8/2016 |

(Continued)

OTHER PUBLICATIONS

Zhang, Haiou, et al. "Study on Metamorphic Rolling Mechanism for Metal Hybrid Additive Manufacturing." The 24th international SFF symposium—an additive manufacturing conference. Aug. 2013.*

(Continued)

*Primary Examiner* — Benjamin A Schiffman
(74) *Attorney, Agent, or Firm* — Wilson Sonsini Goodrich & Rosati

(57) ABSTRACT

A method and apparatus for additive manufacturing wherein a fiber composite filament having an arbitrarily shaped cross section is softened and then flattened to tape-like form factor for incorporation into a part that is being additively manufactured.

25 Claims, 4 Drawing Sheets

(51) Int. Cl.
　　　B29K 105/08　　(2006.01)
　　　B29K 101/12　　(2006.01)
　　　B29C 64/268　　(2017.01)
　　　B29C 64/218　　(2017.01)

(56) References Cited

U.S. PATENT DOCUMENTS

| | | | |
|---|---|---|---|
| 6,391,251 | B1 | 5/2002 | Keicher et al. |
| 6,441,342 | B1 | 8/2002 | Hsu |
| 7,024,272 | B2 | 4/2006 | Thomas et al. |
| 7,483,818 | B2 | 1/2009 | Amakai et al. |
| 7,896,209 | B2 | 3/2011 | Batchelder et al. |
| 7,897,074 | B2 | 3/2011 | Batchelder et al. |
| 8,308,876 | B2 | 11/2012 | Woods et al. |
| 8,808,603 | B2 | 8/2014 | Swanson |
| 8,920,697 | B2 | 12/2014 | Mikulak et al. |
| 9,102,099 | B1 | 8/2015 | Karpas et al. |
| 9,126,367 | B1 | 9/2015 | Mark et al. |
| 9,156,205 | B2 | 10/2015 | Mark et al. |
| 9,254,535 | B2 | 2/2016 | Buller et al. |
| 9,321,609 | B2 | 4/2016 | Koop et al. |
| 9,327,452 | B2 | 5/2016 | Mark et al. |
| 9,327,453 | B2 | 5/2016 | Mark et al. |
| 9,339,972 | B2 | 5/2016 | Gordon |
| 9,533,451 | B2 | 1/2017 | Folgar et al. |
| 9,579,851 | B2 | 2/2017 | Mark et al. |
| 9,592,660 | B2 | 3/2017 | Reese et al. |
| 9,595,037 | B2 | 3/2017 | Glasgow et al. |
| 9,656,429 | B1 | 5/2017 | Mantha et al. |
| 9,738,030 | B2 | 8/2017 | Lee et al. |
| 9,757,880 | B2 | 9/2017 | Rothfuss et al. |
| 9,796,140 | B2 | 10/2017 | Page et al. |
| 9,815,268 | B2 | 11/2017 | Mark et al. |
| 2010/0312364 | A1 | 12/2010 | Eryilmaz et al. |
| 2013/0101728 | A1 | 4/2013 | Keremes et al. |
| 2013/0255346 | A1 | 10/2013 | Danby et al. |
| 2013/0316081 | A1 | 11/2013 | Kovalcik et al. |
| 2014/0232035 | A1 | 8/2014 | Bheda |
| 2014/0265035 | A1 | 9/2014 | Buser et al. |
| 2014/0268604 | A1 | 9/2014 | Wicker et al. |
| 2014/0277669 | A1 | 9/2014 | Nardi et al. |
| 2014/0291886 | A1 | 10/2014 | Mark et al. |
| 2014/0328963 | A1 | 11/2014 | Mark et al. |
| 2014/0361460 | A1 | 12/2014 | Mark |
| 2014/0371895 | A1 | 12/2014 | Sadusk et al. |
| 2015/0045928 | A1 | 2/2015 | Perez et al. |
| 2015/0052025 | A1 | 2/2015 | Apsley et al. |
| 2015/0251356 | A1 | 9/2015 | Batchelder et al. |
| 2015/0273583 | A1 | 10/2015 | Bumgardner |
| 2015/0298393 | A1 | 10/2015 | Suarez |
| 2015/0321422 | A1 | 11/2015 | Boyer |
| 2015/0328839 | A1 | 11/2015 | Willis et al. |
| 2015/0331402 | A1 | 11/2015 | Lin et al. |
| 2015/0336292 | A1 | 11/2015 | Mikulak et al. |
| 2015/0360288 | A1 | 12/2015 | Zalewski et al. |
| 2016/0075091 | A1 | 3/2016 | Cable |
| 2016/0129643 | A1 | 5/2016 | Mark et al. |
| 2016/0136887 | A1 | 5/2016 | Guillemette et al. |
| 2016/0144565 | A1 | 5/2016 | Mark et al. |
| 2016/0144566 | A1 | 5/2016 | Mark et al. |
| 2016/0151833 | A1 | 6/2016 | Tsao |
| 2016/0159012 | A1 | 6/2016 | Lee et al. |
| 2016/0236279 | A1 | 8/2016 | Ashton et al. |
| 2016/0236414 | A1 | 8/2016 | Reese et al. |
| 2016/0236416 | A1 | 8/2016 | Bheda et al. |
| 2016/0236419 | A1 | 8/2016 | Griffin et al. |
| 2016/0243649 | A1 | 8/2016 | Zheng et al. |
| 2016/0257068 | A1 | 9/2016 | Albert et al. |
| 2016/0266573 | A1 | 9/2016 | Bheda et al. |
| 2016/0271880 | A1 | 9/2016 | Bheda et al. |
| 2016/0288264 | A1 | 10/2016 | Jones et al. |
| 2016/0297142 | A1 | 10/2016 | Bheda et al. |
| 2016/0297935 | A1 | 10/2016 | Reese et al. |
| 2016/0311165 | A1 | 10/2016 | Mark et al. |
| 2016/0325491 | A1 | 11/2016 | Sweeney et al. |
| 2016/0332366 | A1 | 11/2016 | Donovan |
| 2016/0332380 | A1 | 11/2016 | De et al. |
| 2016/0346998 | A1 | 12/2016 | Mark et al. |
| 2016/0361869 | A1 | 12/2016 | Mark et al. |
| 2016/0368213 | A1 | 12/2016 | Mark |
| 2017/0021565 | A1 | 1/2017 | Deaville |
| 2017/0057167 | A1 | 3/2017 | Van et al. |
| 2017/0072633 | A1 | 3/2017 | Hsu |
| 2017/0120519 | A1 | 5/2017 | Mark |
| 2017/0173868 | A1 | 6/2017 | Mark |
| 2017/0197371 | A1 | 7/2017 | Fetfatsidis et al. |
| 2017/0210074 | A1 | 7/2017 | Ueda et al. |
| 2017/0304894 | A1 | 10/2017 | Buller |
| 2017/0326802 | A1 | 11/2017 | Mark et al. |

FOREIGN PATENT DOCUMENTS

| | | | |
|---|---|---|---|
| EP | 3148711 | A1 | 4/2017 |
| EP | 3150361 | A1 | 4/2017 |
| KR | 20130060144 | A | 6/2013 |
| WO | WO-2015009938 | A1 | 1/2015 |
| WO | WO-2015042422 | A1 | 3/2015 |
| WO | WO-2015163776 | A1 | 10/2015 |
| WO | WO-2017008789 | A1 | 1/2017 |
| WO | WO-2017100783 | A1 | 6/2017 |
| WO | WO-2017123726 | A1 | 7/2017 |
| WO | WO-2017210490 | A1 | 12/2017 |

OTHER PUBLICATIONS

U.S. Appl. No. 15/845,629 Office Action dated Apr. 13, 2018.
U.S. Appl. No. 15/845,673 Office Action dated Apr. 11, 2018.
U.S. Appl. No. 15/845,762 Office Action dated Apr. 6, 2018.
U.S. Appl. No. 15/845,843 Office Action dated Apr. 3, 2018.
PCT/US2017/050155 International Search Report and Written Opinion dated Dec. 7, 2017.
Clausen, et al. Exploiting Additive Manufacturing Infill in Topology Optimization for Improved Buckling Load. Engineering 2.2 (2016): 250-257.
Co-pending U.S. Appl. No. 15/845,629, filed Dec. 18, 2017.
Co-pending U.S. Appl. No. 15/845,673, filed Dec. 18, 2017.
Co-pending U.S. Appl. No. 15/845,762, filed Dec. 18, 2017.
Co-pending U.S. Appl. No. 15/845,843, filed Dec. 18, 2017.
International search report and written opinion dated Aug. 17, 2017 for PCT Application No. PCT/US2017/035551.
International search report and written opinion dated Nov. 22, 2017 for PCT Application No. PCT/US2017/045986.
Notice of allowance dated Jan. 4, 2017 for U.S. Appl. No. 15/232,767.
Notice of allowance dated Apr. 27, 2017 for U.S. Appl. No. 15/232,767.
Notice of allowance dated Nov. 30, 2017 for U.S. Appl. No. 14/623,471.
Office action dated Mar. 30, 2017 for U.S. Appl. No. 14/623,471.
Office action dated Aug. 30, 2017 for U.S. Appl. No. 14/623,471.
Office action dated Sep. 14, 2017 for U.S. Appl. No. 14/621,205.
Office action dated Nov. 14, 2016 for U.S. Appl. No. 15/232,767.
Wong, et al. A review of additive manufacturing. ISRN Mechanical Engineering 2012.
Wu, et al. Infill Optimization for Additive Manufacturing—Approaching Bone-like Porous Structures. IEEE Transactions on Visualization and Computer Graphics (2017).
PCT/US2017/050153 International Search Report and Written Opinion dated May 24, 2018.

* cited by examiner

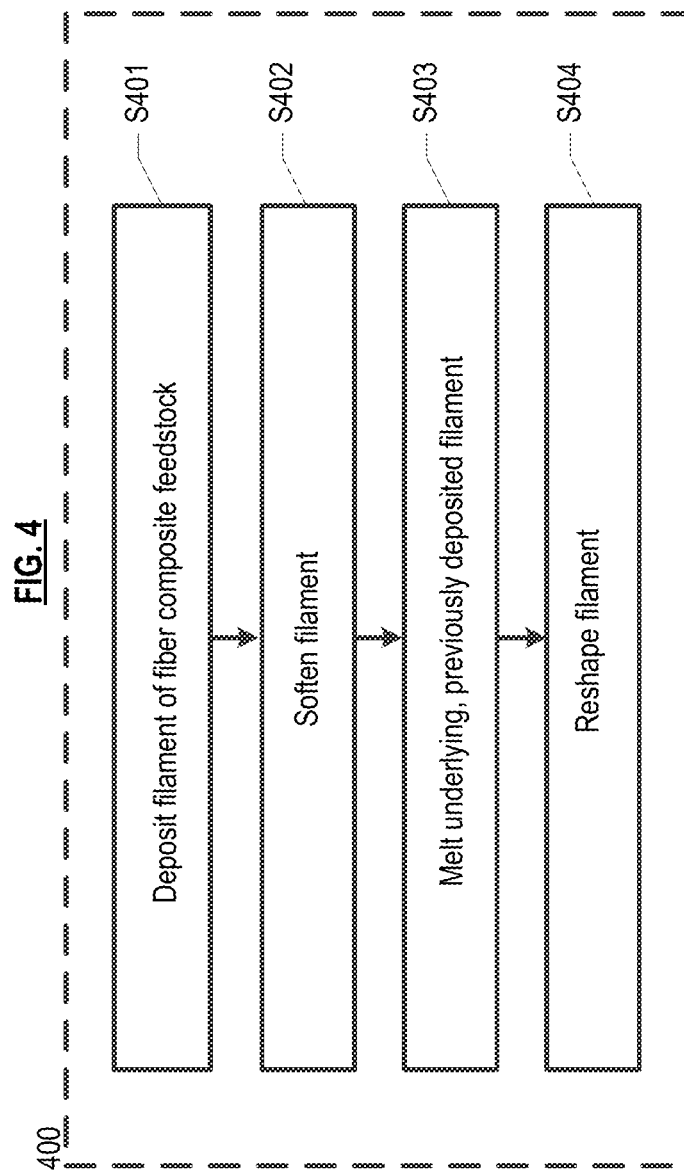

METHOD FOR ADDITIVE MANUFACTURING USING FILAMENT SHAPING

CROSS-REFERENCE TO RELATED APPLICATIONS

This case claims priority of U.S. patent application Ser. No. 62/314,000 filed Mar. 28, 2016, which is incorporated by reference herein.

FIELD OF THE INVENTION

The present invention generally relates to an additive manufacturing process using fiber composites.

BACKGROUND OF THE INVENTION

Additive manufacturing—so called "3D printing"—is the term given to processes that manufacture objects via sequential-layer material addition/joining throughout a 3D work envelope under automated control. ISO/ASTM52900-15 defines seven categories of additive manufacturing processes: binder jetting, directed energy deposition, material extrusion, material jetting, powder bed fusion, sheet lamination, and vat polymerization.

Composite 3D printing processes produce an object or part (hereinafter collectively "part") by depositing composite filaments made of continuous fiber-reinforced thermoplastics, which quickly harden to form a layer. Successive layers of material are deposited to build the object.

A fiber composite consists of fibers as the discontinuous phase, a matrix (typically a resin) as the continuous phase, and an interface region (the interface). The strength of a fiber composite is determined by the wettability of the fiber within the resin matrix. Wettability refers to the degree of adhesion and bonding between the resin and the fibers. A high degree of wetting means the resin has good surface adhesion to the fibers, coating the fibers uniformly. A low degree of wetting means the fibers are not completely coated by resin, resulting in void space or bubbles between the fiber and resin.

When subjected to stress, a composite part with a high degree of wetting will effectively transfer the stress to the fibers through the resin matrix. This composite part then has a much higher tensile strength as compared to a part made only of resin material. In comparison, a composite part with a low degree of wetting will experience fiber pullout when subjected to stress. Fiber pullout results in ineffective stress transfer from the resin matrix to the fibers due to the void space at the fiber/resin interfaces. The void space acts as nucleating sites for cracks, resulting in premature failure of the part via crack propagation. The composite part with a low degree of wetting has a lower tensile strength as compared to a part made only of the resin material due to the higher void space with this composite part.

To ensure a high degree of wetting, the composites industry mostly uses thermoset (e.g., epoxy, etc.) resin systems. Thermosets typically have a low viscosity compared to other polymers, resulting in high melt flow and a high degree of fiber wetting. While thermoset resins provide sufficient wetting, they cannot tolerate higher operating temperatures, often limited to 100° C. or less. As compared to thermosets, thermoplastics generally have a higher viscosity, making it more difficult to achieve sufficient fiber wetting; however, thermoplastics offer higher tensile strength and stiffness, higher toughness, and a higher operating temperature as compared to thermoset resins.

U.S. patent application Ser. No. 14/184,010 discloses an apparatus for manufacturing an object having a deposition head including a nozzle for heating thermoplastic composite material having one or more fiber strands. In some embodiments, the apparatus also includes a turntable, a robotic arm for moving the deposition head, and spools of composite filament.

That invention involved the use of a heated extrusion nozzle to melt and deposit thermoplastic fiber-composite filament. The composite feed filament comprises thousands (e.g., 1K, 3K, 6K, 12K, 24K, etc.) of continuous fibers impregnated with thermoplastic resin. The continuous fiber includes, without limitation, carbon, fiberglass, aramid (AKA Kevlar), and carbon nanotubes (CNT). The composite filament has a cylindrical, elliptical, or rectangular cross section. In the case of a rectangular cross section, the aspect ratio (width-to-thickness) is about 3:2; that is, it is distinguishable from a tape, which is significantly wider than it is thick.

That deposition process completely melts the thermoplastic filament as it contacts the nozzle. As the continuous filament is pushed through the nozzle, the pressure of the nozzle forces the polymer underneath the continuous carbon fiber tow, which can result in exposed fiber on the top surface. As a result, there is a loss of fiber adhesion within the polymer matrix and the wetting of the fibers by the polymer is reduced.

In addition to a loss of wetting, this type of deposition involves a 90-degree bend between the nozzle and part being manufactured, which can cause fiber breakage and damage. More specifically, as the fibers bend around a 90-degree angle in the melt phase, the fibers become twisted and tangled together. The twisting and tangling of the fibers can cause them to break, reducing the overall strength and stiffness of the deposited material. The twisting and tangling further reduces the wetting of the fibers and also produces an uneven, rough surface finish.

Therefore, a need exists for way to improve the mechanical properties, surface fidelity, and finish of additively manufactured thermoplastic fiber composite parts.

SUMMARY

The present invention provides a way to improve properties of additively manufactured parts in comparison to the prior art.

In accordance with the illustrative embodiment, a fiber composite filament (towpreg) having an arbitrarily shaped cross section, which is typically circular, ellipsoidal, or rectangular (hereinafter "substantially circular") is softened and then flattened, increasing its aspect ratio (width-to-thickness). In particular, whereas the feed filament will have an aspect ratio of about 1 (for circular filaments) to about 1.5 (typical for rectangular composite filaments), the flattened filament will typically have an aspect ratio of at least about 5. That is, the flattened filament will have a tape-like form factor, wherein its width is noticeably greater than its thickness.

In the illustrative embodiment, the filament is flattened via a shaper, such as a roller, which applies a compressive force to the filament. A focused heat source, which in the illustrative embodiment is a laser (e.g., diode, fiber, etc.), first softens and eventually melts at least a portion of the composite filament.

Compared to the prior-art processes, embodiments in accordance with the present provide certain advantages. For example, with respect to processing fiber-composite feedstocks via a heated nozzle, the loss of wetting and fiber breakage issues that plague such processes are substantially avoided. In particular, because the filament material is not completely melted, resin does not flow out of the carbon fiber. This prevents or reduces the loss of wetting associated with complete melting as in the prior art.

Furthermore, the flattened shape is desired for a deposited composite filament, because this shape is more conducive to the additive manufacturing process and produces parts with better material properties as compared to deposited composite having a circular or elliptical cross section. Notwithstanding the tape-like form that results after flattening, embodiments of the invention do not suffer from the shortcomings, discussed below, of prior-art molding processes that use a tape-based feedstock, such as AFP (automated fiber placement), ATL (automated tape layup), and FW (filament winding).

In AFP, thin tapes having a rectangular cross section (c.a. 0.250 inches wide by 0.006 inches thick) are sequentially placed onto a form or mold to create an object. Among any other reasons, the tape form factor is used so that tapes may be placed adjacent to each other, thereby covering the entire surface of the mold while maintaining conformability of the individual strips. The cross section of the tape is not typically changed during processing (typically, there is no way to do so). Furthermore, it would be undesirable to alter the cross section, because this would change the positioning of the tape. The positioning of the tape must be maintained so as to minimize gaps or overlaps between strips of tapes. These tapes are limited in their ability to be "steered" or turned in-plane, driving the industry towards narrower and narrower tapes (to enable a measure of steering) while maintaining their thickness.

ATL is an architecturally identical process to AFP, but uses relatively wider tapes (>3") than AFP while maintaining the typical thickness (c.a. 0.006 inches). This process is functionally limited to producing objects with relatively large curvatures, wherein only minimal steering of the tape is possible.

In the FW process, a fiber is wound around a cylindrical mandrel. The consolidation force is applied via fiber tension. This limits objects produced via this process to convex, closed-section geometries and prohibits in-plane steering (all fiber paths must typically follow a geodesic path). Furthermore, the ability to apply process heat to the incoming material is severely limited, making in-situ consolidation of high-temperature thermoplastics exceedingly difficult.

Because the composite filament is not flattened prior to deposition in embodiments of the invention, it is easy to steer or otherwise place the filament in any location in space, enabling the printing of parts that include both open and closed cross section with highly contoured geometries and small radii corners that are not possible with tape based methods. Thus, the tape-like form of the composite filament is acquired after each segment of the filament is positioned. Consider, for example, the forms depicted in FIGS. 1A through 1D.

FIG. 1A depicts a composite filament being steered, on edge, in a spiral path (3 dimensions), such as for forming ducts or coil springs, in accordance with some embodiments of the invention. FIG. 1B depicts a composite filament being steered in a serpentine path (2 dimensions), such as for forming a flat spring, in accordance with some embodiments of the invention. FIG. 1C depicts a composite filament being steered to form objects having "T-" or "L-" shaped profiles, such as objects with sharp inside or outside corners. And FIG. 1D depicts an undulating surface, which can be a surface of part formed via the ability to steer composite filaments as described herein.

At the same time, embodiments of the invention avoid the problems associated with depositing a composite filament through a heated nozzle (loss of wetting, etc.). Additionally, better inter-laminar strength is achieved than in the prior art since additional polymer-bonding mechanisms are utilized. In particular, the polymer is more thoroughly intermixed with the substrate improving heat transfer and bonding. Furthermore, controlling the compaction force (via positioning of a robotic arm, etc.) in accordance with embodiments of the invention enables the width (and thickness) of a deposited filament to be varied, as needed, rather than being limited by a fixed tape width, as in the AFP, ATL, or FW processes.

The prior-art processes discussed above cannot manufacture parts in such fashion or with such surface features or, as in the case with additive manufacturing through a heated nozzle, are likely to result in objects having compromised final properties.

BRIEF DESCRIPTION OF THE DRAWINGS

FIG. 4 depicts a method for additive manufacturing in accordance with an illustrative embodiment of the present invention.

DETAILED DESCRIPTION OF THE INVENTION

Figure 1A:
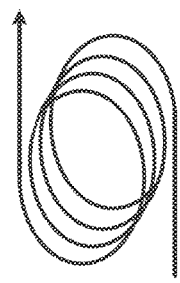
FIGS. 1A-1D depict various paths that can be followed, and profiles and surfaces that can be formed, via embodiments of the present invention.
Figure 1B:
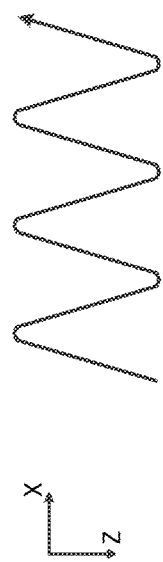
Figure 1C:
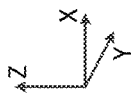
Figure 1D:
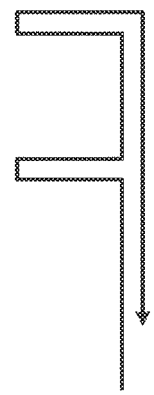
Figure 2:
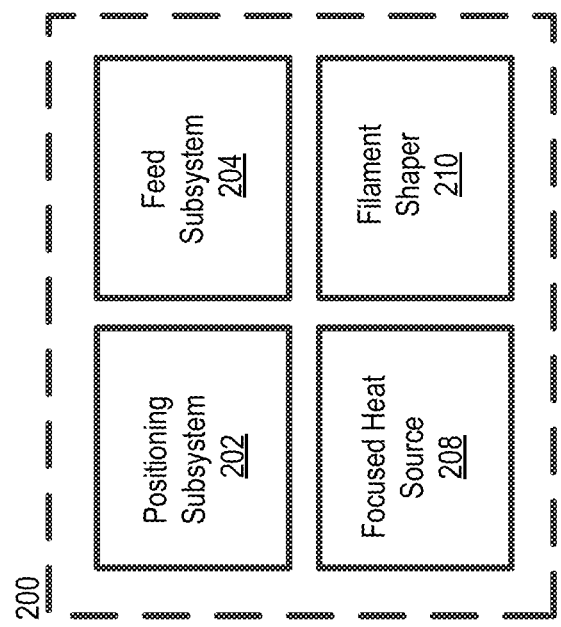
FIG. 2 depicts a block diagram of the salient components of an additive manufacturing system that employs composite filament shaping in accordance with an illustrative embodiment of the present invention.

FIG. 2 depicts the salient functional elements of deposition system 200 in accordance with the present invention. Included in system 200 are positioning subsystem 202, feed subsystem 204, focused heat source 206, and shaper 210.

In the illustrative embodiment, positioning subsystem 202 comprises a multi-axis end effector (e.g., robotic arm, etc.). In the illustrative embodiment, the multi-axis end effector has sufficient degrees of freedom (i.e., six DOF) to enable true three-dimensional printing. That is, the positioning subsystem is capable of delivering a feed filament to an arbitrary location in space, as specified in accordance with the build instructions. This enables system 200 to print along the natural loading contours of an part. Printing with such a multi-axis end effector is described, for example, in Ser. No. 14/184,010, previously referenced and incorporated by reference herein.

In some other embodiments, positioning subsystem 202 comprises a gantry having one or two translational degrees of freedom (x and/or y axes). In some of such embodiments, a build plate, on which the part is printed, is also considered to be part of the positioning subsystem. In such embodiments, the build plate is movable in the z direction (and possibly the x or y direction depending on gantry capabilities), such that three degrees of freedom are provided for the build. In some further embodiments, a robotic arm can be supported by a gantry. It is within the capabilities of those skilled in the art to design or specify a robotic arm, other multi-axis end effector, or gantry system to provide the requisite functionality for system 200.

Feed subsystem 204 delivers a filament to a build surface (e.g., a build plate, previously deposited layers of filament, etc.). In the illustrative embodiment, the composite filament is a cylindrical towpreg consisting of a continuous fiber (e.g., 1K, 3K, 6K, 12K, 24K, etc.) impregnated with thermoplastic resin. The continuous fiber includes, without limitation, carbon, fiberglass, aramid (AKA Kevlar), or carbon nanotubes (CNT).

The thermoplastic can be a semi-crystalline polymer or a mixture of a semi-crystalline polymer and an amorphous polymer. The semi-crystalline material can be, for example and without limitation, a polyaryletherketone (PAEK), such as polyetherketone (PEK), polyetheretherketone (PEEK), polyetherketoneketone (PEKK), polyetheretherketoneketone (PEEKK), and polyetherketoneetherketoneketone (PEKEKK). The semi-crystalline polymer can also be other semi-crystalline thermoplastics, for example and without limitation, polyamide (PA), polybutylene terephthalate (PBT), poly(p-phenylene sulfide) (PPS).

In embodiments in which the feed is a blend of an amorphous polymer with a semi-crystalline polymer, the semi-crystalline polymer can be one of the aforementioned materials and the amorphous polymer can be a polyarylsulfone, such as polysulfone (PSU), polyethersulfone (PESU), polyphenylsulfone (PPSU), polyethersulfone (PES), polyetherimide (PEI). In some additional embodiments, the amorphous polymer can be, for example and without limitation, polyphenylene oxides (PPOs), acrylonitrile butadiene styrene (ABS), methyl methacrylate acrylonitrile butadiene styrene copolymer (ABSi), polystyrene (PS), and polycarbonate (PC).

In the blend, the weight ratio of semi-crystalline material to amorphous material is in a range of about 50:50 to about 95:05, inclusive, or about 50:50 to about 90:10, inclusive. Preferably, the weight ratio of semi-crystalline material to amorphous material in the blend is between 60:40 and 80:20, inclusive. The ratio selected for any particular application is primarily a function of the materials used and the properties desired for the printed part.

Focused heat source 206 provides accurate control of the processing temperature of the composite filament. In the illustrative embodiment, the focused heat source is a laser. The beam spot size of a laser is precisely controllable. In accordance with the illustrative embodiment, such precise control of beam-spot size enables the laser to be aligned to heat at least a portion of a previously deposited (underlying) layer of filament to melting while, at the same time, softening (but not melting) or only partially melting the filament being deposited.

In the illustrative embodiment, focused heat source 206 precisely heats the composite filament above its glass transition temperature up to its melting temperature. In the illustrative embodiment, the resin in the composite filament is either not melted, or not completely melted, such that resin does not flow (or flow minimally) out of the filament (e.g., carbon fiber, etc.). This prevents or reduces the loss of wetting associated with movement of the polymer resin out of the fiber, as previously discussed. The temperature at which any particular composite filament feedstock softens is a function of its composition. Those skilled in the art can readily determine a desired "softening" temperature by simple experimentation.

After softening, the composite filament is reshaped. In particular, the composite filament is flattened so that it acquires a more tape-like form. As previously noted, the flattened form is desirable for a composite filament because this shape is conducive to the additive manufacturing process and produces parts with better material properties as compared to those built from composite filaments having substantially circular cross sections.

In some embodiments of the invention, the underlying filament is at least partially melted. By doing so, the bonding and adhesion between the underlying filament and the just-deposited, overlying filament increases, enhancing the overall mechanical properties of the nascent part.

In some embodiments in which the underlying filament is at least partially melted, the portion that is partially melted is the portion adjacent to the overlying filament. In some embodiments, a portion of the just-deposited (overlying) filament is melted. In some of such embodiments, the melted portion is the "lower" portion of the composite filament. Thus, in some embodiments, an "upper" portion of the underlying filament is melted and a "lower" portion of the overlying filament is melted. It is to be understood that the fiber doesn't melt; rather, the thermoplastic in and around the fiber melts.

In some embodiments, about 10 percent to about 50 percent of the original (unflattened) thickness of the overlying composite filament is melted. In other words, in some embodiments, up to about one-half of the composite fiber (the lower half) is melted.

It is very difficult or impossible to exercise the precise control over temperature profiles that is required to maintain wettability and provide the partial melting described above when using a conventional heat source (e.g., a conductive heating element, directed hot air, etc.). Hence, in the illustrative embodiment, focused heat source 206 is used to provide precisely controlled heating of a just-deposited composite filament as well as an underlying composite filament.

In some alternative embodiments, other focused heated sources may suitably be used, such as, without limitation, a concentrated microwave source (MASER), focused ultrasonic sound, focused infrared radiation, ion beam, and electron beam.

Shaper 210 applies "downward-directed" pressure to the softened/partially melted filament, thereby controlling its position/location and altering its cross section from substantially circular to a flattened form. As used in this disclosure and the appended claims, the term "flattened" means that the width of the composite fiber is at least 5 times greater than its thickness. Furthermore, the term "flattened" includes cross sections that are not literally "flat-rectangular," including, without limitation, plano-convex, plano-concave, biconcave, and meniscus. Such not-literally-rectangular forms may result, for example, from the shape of an underlying build surface. As previously mentioned, alteration of the cross section in the aforementioned fashion facilitates consolidation of the composite filament into the geometry of the desired object.

Figure 3:
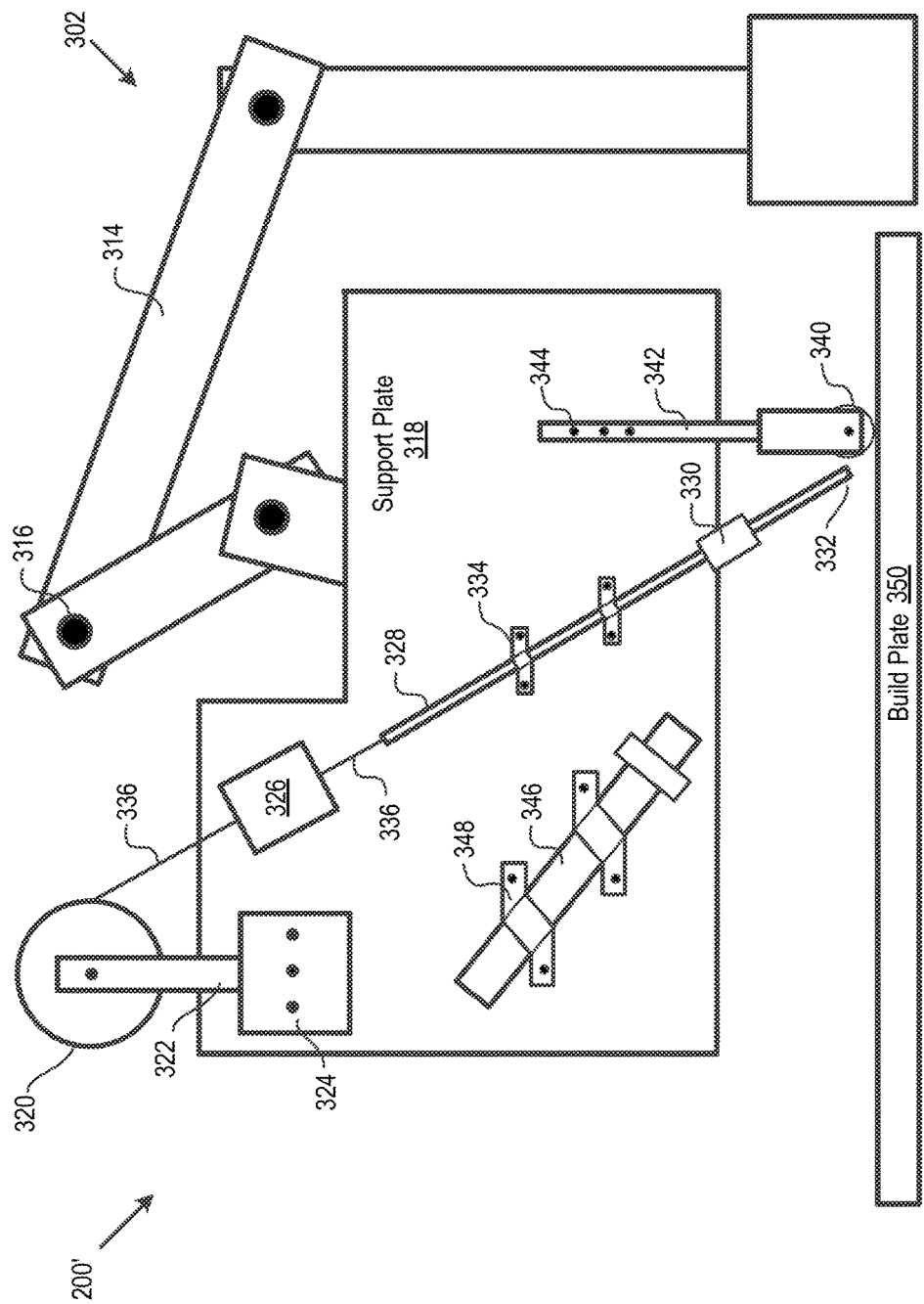
FIG. 3 depicts an illustrative embodiment of the additive manufacturing system of FIG. 2.

FIG. 3 depicts deposition system 200' in accordance with an illustrative embodiment of invention. System 200' is an implementation of system 200 depicted in FIG. 2.

In system 200', positioning subsystem 202 is embodied as notional robotic arm 302. The robotic arm is coupled to support plate 318, which supports the various subsystems and elements of system 200'. Robotic arm 302 moves support plate 318, and all subsystems/elements attached thereto, so as to position the system to deliver a composite filament to a desired point in space consistent with the build instructions for the part.

In the illustrative embodiment, robotic arm 302 is appropriately configured with rigid members 314 and joints 316 to provide six degrees of freedom (three in translation: x, y, and z axes; and three in orientation: pitch, yaw, and roll).

In system 200', feed subsystem 204 includes spool 320, feed motor 326, feed tube 328, and cutter 330. Spool 320 is rotatably coupled to member 322, the latter of which is attached (e.g., via bolts 324, etc.) to support plate 318. Composite filament 336 is wound around spool 320. The filament passes through motor 326, feed tube 328, and cutter 330. Motor 326 draws composite filament 336 from spool 320. As it passes through cutter 330, filament 336 is sized, as appropriate, in accordance with build instructions. Feed tube 328 is attached to support plate 318, such as via clamps 334.

Filament 336 is delivered to build plate 350 from delivery end 332 of feed tube 328. It will be appreciated that if manufacture of a part has already begun, filament 336 might be delivered to a previously deposited layer of composite filament. The term "build surface," as used in this disclosure and the appended claims, refers to either a build plate, etc., such as build plate 350, or a previously deposited layer of material, or anything else that filament 336 might be deposited upon.

In the illustrative embodiment, feed tube 328 is used to simply deliver and guide filament, in its original form (i.e., no change in shape, etc.) to the build plate 350. In some embodiments, feed tube 328 is not heated.

In some embodiments, delivery end 332 of the feed tube 328 is appropriately configured and/or positioned to deliver the composite filament directly underneath shaper 210, which is embodied in the illustrative embodiment as roller 340.

Roller 340 rotates about pin 341 but is otherwise rigidly coupled to support plate 318 via member 342 and bolts 344. In other words, roller 340 is free to rotate about pin 341 along the x-direction, but is rigidly coupled to support plate 318 with respect to movements along the y-direction and the z-direction.

In system 200', focused heat source 206 is embodied as laser 346, such as a diode or fiber laser, although other types of lasers may suitably be used. Laser 346 is rigidly coupled to support plate 318, such as via clamps 348.

In the illustrative embodiment, laser 346 is aligned to illuminate the portion of filament delivered to build plate 350. The laser heats the filament to softening for incorporation into the build object.

As previously noted, a laser is preferentially used as focused heat source 208 because it enables precise and accurate control of the processing temperature. Because the laser spot size can be precisely controlled, the laser can be directed to melt a previously deposited, underlying layer while simply heating the currently deposited layer until it softens. Or the laser can be directed to partially melt both the underlying and overlying layer. Again, melting the underlying layer during the deposition process results in an increase in bonding and adhesion between the layers, enhancing the overall mechanical properties of the build object.

In some other embodiments, one laser is used for softening or partially melting the just-deposited filament, while a second laser is used to at least partially melt a previously deposited layer. In some further embodiments, a focused heat source is used to melt the underlying filament, but a heat source other than a laser (not necessarily a focused heat source; for example, a hot air blower, etc.) is used to soften the filament being deposited. This can occur before directly before or after the filament is deposited.

Robotic arm 302 positions support plate 318 such that roper 340 applies pressure to the deposited filament. The applied pressure ensures that the filament sticks and adheres to the underlying layer. In the absence of such pressure, only gravity is available to bond and adhere the filament to the underlying layer, providing a relatively weak interface.

Furthermore, as previously discussed, the applied pressure reshapes the cross section of the filament from substantially circular to a flattened form. That is, the substantially cylindrical composite filament feed is transformed into a flattened substantially tape-like form.

In the prior art, wherein gravity alone is applied during deposition, the composite filament's cross section morphs from circular/rectangular to elliptical. Elliptical-shaped filaments tend to leave gaps and interstices in the build object. These gaps and interstices can act as nucleation sites for crack propagation, negatively impacting the mechanical properties of the build part. On the other hand, the flattened form in accordance with embodiments of the invention results in parts having minimal void/interstitial space. This results in printed parts having relatively better material properties.

In illustrative embodiment, there is a 1:1 input-to-output material feed rate (i.e., the cross-sectional area of the filament entering the system equals that of the filament exiting the system to create the build object). Thus, although the cross-sectional shape of the composite filament changes in accordance with the present teachings (i.e., it is flattened), the cross-section area of the filament does not change.

FIG. 4 depicts method 400 for additive manufacturing. In accordance with operation S401, a filament is deposited on the build surface or previously deposited layer of filament. In the illustrative embodiment, the filament is softened or partially melted, per operation S402. In the illustrative embodiment, the filament is softened after deposition; however, in some alternative embodiments, the filament is softened immediately prior to deposition.

The important point here is that the composite filament must retain the ability to be shapeable (i.e., re-shaped to a flattened form of desired width and/or thickness). It is notable that a liquid will take the shape of a vessel, etc., into which it is poured. That is not a contemplated embodiment; in embodiments of the invention, the composite filament retains form/shape without external constraints.

In operation S403, at least a portion of the filament underlying the most recently deposited filament is melted. Per operation S404, the feed composite filament, which typically has a substantially circular cross section, is reshaped to a flattened form having a tape-like aspect ratio. As previously noted, the width of the reshaped composite filament is at least 5 times greater than its thickness. In the illustrative embodiment, reshaping is accomplished via applied pressure; that is, by compressing the composite filament.

In some embodiments, operations S402 and S403 are performed concurrently. In some other embodiments, operation S402 is performed before operation S403. In some embodiments, operations S402, S403, and S404 are performed concurrently.

It is to be understood that although this disclosure teaches many examples of embodiments in accordance with the present teachings, many additional variations of the invention can easily be devised by those skilled in the art after reading this disclosure. As a consequence, the scope of the present invention is to be determined by the following claims.

What is claimed:

1. A method for additive manufacturing, comprising:
   depositing a first fiber composite filament on a build surface;
   softening the first fiber composite filament on the build surface, wherein, after softening, the first fiber composite filament retains an ability to be shaped; and
   flattening the first fiber composite filament.

2. The method of claim 1, wherein softening the first fiber composite filament further comprises partially melting a second fiber composite filament that underlies the first fiber composite filament.

3. The method of claim 2, wherein the softening the partially melting occur concurrently.

4. The method of claim 3, wherein a heat source used to soften the first fiber composite filament is the same heat source that is used to partially melt the second fiber composite filament.

5. The method of claim 1, wherein softening the first fiber composite filament further comprises exposing the first fiber composite filament to heat from a heat source.

6. The method of claim 1, wherein flattening the first fiber composite filament further comprises altering a shape of a cross section thereof while maintaining a cross-sectional area thereof.

7. The method of claim 1, wherein flattening the first fiber composite filament further comprises applying pressure thereto.

8. The method of claim 1, wherein flattening the first fiber composite filament further comprises positioning the first fiber composite filament in a path of a roller.

9. The method of claim 1, wherein the first fiber composite filament is a towpreg.

10. The method of claim 1, further comprising cutting a filament to yield the first fiber composite filament, and subsequently depositing the first fiber composite filament on the build surface.

11. The method of claim 1, wherein the first fiber composite filament is softened using at least one laser beam directed to at least a portion of the first fiber composite filament.

12. The method of claim 1, wherein the first fiber composite filament is softened after a length of the first fiber composite filament is deposited on the build surface.

13. A method for additive manufacturing, comprising:
    delivering, without a change in cross-sectional area, a fiber composite filament onto a build surface; and
    reshaping the fiber composite filament by softening or partially melting the fiber composite filament, wherein, before reshaping, the fiber composite filament has a substantially circular cross section and after reshaping, the fiber composite filament is flattened.

14. The method of claim 13, wherein partially melting the fiber composite filament further comprises melting a lower portion, but not the upper portion, of the fiber composite filament.

15. The method of claim 13, wherein an upper portion of a second fiber composite filament underlying and abutting the fiber composite filament is melted.

16. The method of claim 15, wherein reshaping the fiber composite filament further comprises illuminating, with laser light from a single laser, the fiber composite filament and the second fiber composite filament.

17. The method of claim 13, wherein reshaping the fiber composite filament further comprises compressing the softened fiber composite filament, thereby flattening same.

18. The method of claim 13, wherein partially melting the fiber composite filament comprises melting a portion of fiber composite filament, wherein the melted portion is:
    a) proximal to the build surface; and
    b) up to 50 percent of a thickness of the fiber composite filament prior to flattening.

19. A method for additive manufacturing, comprising:
    depositing a second fiber composite filament on a first fiber composite filament;
    melting an upper portion, but not all, of the first fiber composite filament and melting a lower portion, but not all, of the second fiber composite filament, wherein, after melting the lower portion, the second fiber composite filament retains an ability to be shaped; and
    flattening the second fiber composite filament.

20. The method of claim 19, further comprising focusing a laser so that laser light from the laser melts the upper portion of the first fiber composite filament and the lower portion of the second fiber composite filament.

21. The method of claim 19, wherein the upper portion, but not all, of the first fiber composite filament is melted using a first laser beam and the lower portion, but not all, of the second fiber composite filament is melted using a second laser beam, wherein the first laser beam and the second laser beam are different.

22. The method of claim 19, wherein from about 10 percent to 50 percent of the second fiber composite filament is melted.

23. The method of claim 19, wherein a length of the second fiber composite filament is deposited on the first fiber composite filament before (i) the upper portion, but not all, of the first fiber composite filament and the lower portion, but not all, of the second fiber composite filament are melted and (ii) the second fiber composite filament is flattened.

24. The method of claim 19, wherein the second fiber composite filament is a towpreg.

25. The method of claim 19, further comprising cutting a filament to yield the second fiber composite filament, and subsequently depositing the second fiber composite filament on the first fiber composite filament.

* * * * *